(12) United States Patent
Solaro et al.

(10) Patent No.: US 7,293,012 B1
(45) Date of Patent: Nov. 6, 2007

(54) FRIENDLY URLS

(75) Inventors: John A. Solaro, Issaquah, WA (US); Jinsong Yu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 10/741,976

(22) Filed: Dec. 19, 2003

(51) Int. Cl.
G06F 17/30 (2006.01)

(52) U.S. Cl. .............................. 707/2; 707/4; 707/10

(58) Field of Classification Search ............... 707/2–4, 707/10; 709/203, 217
See application file for complete search history.

(56) References Cited

U.S. PATENT DOCUMENTS

| | | | | |
|---|---|---|---|---|
| 5,944,793 | A | 8/1999 | Islam et al. | 709/220 |
| 6,470,383 | B1* | 10/2002 | Leshem et al. | 709/223 |
| 6,564,257 | B1* | 5/2003 | Emens et al. | 709/219 |
| 6,636,247 | B1* | 10/2003 | Hamzy et al. | 715/808 |
| 6,748,448 | B1* | 6/2004 | Barrera et al. | 709/245 |
| 6,959,326 | B1* | 10/2005 | Day et al. | 709/217 |
| 6,970,942 | B1* | 11/2005 | King et al. | 709/238 |
| 2003/0158953 | A1* | 8/2003 | Lal | 709/230 |
| 2003/0187668 | A1 | 10/2003 | Ullman et al. | 705/1 |
| 2004/0073691 | A1* | 4/2004 | Sun | 709/230 |
| 2004/0122939 | A1* | 6/2004 | Perkins | 709/224 |
| 2004/0237044 | A1* | 11/2004 | Travieso et al. | 715/530 |

OTHER PUBLICATIONS

Bergman, Michael K. Jul. 2001. "Technology White Papers: The Deep Web: Surfacing Hidden Value." *The Journal of Electronic Publishing* from the University of Michigan, 46pp. Available http://brightplanet.com/technology/deepweb/asp.

BrightPlanet Corporation. Jul. 2003. "Technology White Papers: Comprehensive Access to Internet Content. Robust Knowledge Management. Flexible Product Expressions." 19pp. Available: http://brightplanet.com/technology/technologyoverview.asp.

Broersma, Matthew. Aug. 2002. "Google toolbar exposes PCs to attack." 2pp. Available: http://www.zdnet.com.au/newstech/security/story/0,2000048600,20267316,00.htm.

Cohen, Laura. Oct. 2003. "The Deep Web." University Libraries: University at Albany. 8pp. Available: http://library.albany.edu/internet/deepweb.html.

(Continued)

*Primary Examiner*—Cam Linh Nguyen
(74) *Attorney, Agent, or Firm*—Workman Nydegger

(57) ABSTRACT

A Web crawler, search engine, browser program, or other client application dynamically accesses data by using "friendly" Uniform Resource Locaters (URLs) that do not require query parameters or other non-intuitive coding. A friendly URL includes a static URL that appears to identify a static resource, such as a Hyper Text Markup Language document. A friendly URL can be a link or entered in a browser program's address field. A data type in the friendly URL is mapped to a data source that dynamically accesses data associated with an intuitive data key in the friendly URL. The data key refers to a specific document, and/or is a search term. A query URL is constructed with the data key, and a data source identifier that preferably refers to a database function and is mapped to the data type. The resulting dynamically accessed data are communicated back to the requesting client application.

17 Claims, 6 Drawing Sheets

OTHER PUBLICATIONS

Epinions.com. nd. "Microsoft Encarta Reference Library 2002 For PC." 1pg. Available: http://www.epinions.com/Microsoft_Encarta_Reference_Library_2002_Reference_Software_659556724627.

Lin, King-Ip and Hui Chen. Apr. 2002. "Automatic Information Discovery from the 'Invisible Web.'" 6pp. *International Conference on Information Technology: Coding and Computing.*

Microsoft Corporation. 2003. "HSE_REQ_EXEC_URL." 2pp. Available: http://msdn.microsoft.com/library/default.asp?url=/library/en-us/iisref/htm/Extensions_SSF_HSE_REQ_EXEC_URL.asp.

Microsoft Corporation. nd. "Microsoft Windows Server 2003: Technical Overview of Internet Information Services (IIS) 6.0." 6pp.

Johnson, Detlev. 2001. "Cloaking: Search Engines Shift Gears." 2pp. Available: http://pf.inc.com/articles/2001/06/22851.html.

Roy, Sumantra. Oct. 2003. "Page Cloaking—To Cloak or Not to Cloak." 5pp. Available: http://developers.evrsoft.com/article/internet-marketing/seo/page-cloaking-facts.shtml.

rustybrick.com. Aug. 2003. "Dynamic URLs In The Eyes Of A Search Engine." 4pp. Available: http://developers.evrsoft.com/article/internet-marketing/seo/dynamic-urls-search-engine-shtml.

* cited by examiner

TABLE 1

| DATA TYPE | DATA SOURCE | DATA KEY | TOKEN 1 | TOKEN 2 | TOKEN 3 | TOKEN 4 | TOKEN 5 | TOKEN 6 |
|---|---|---|---|---|---|---|---|---|
| /dictionary_ | /encnet/features/dictionary/DictionaryResult.aspx | refid | wordlistid | | | | | |
| /encyclopedia_ | /encnet/refpages/RefArticle.aspx | refid | pn | scoid | clstrid | clstrpos | s | |
| /weblinks_ | /encnet/refpages/RefWebLnkList.aspx | refid | | | | | | |
| /media_ | /encnet/refpages/RefMedia.aspx | refid | artrefid | sec | pn | vidbw | scoid | para |
| /quote_ | /encnet/refpages/RefQuote.aspx | refid | | | | | | |
| /text_ | /encnet/refpages/RefTextOnly.aspx | refid | pn | find | print | | | |
| /literatures_ | /encnet/refpages/RefLitList.aspx | refid | | | | | | |
| /artcenter_ | /encnet/refpages/RefArtCenter.aspx | seldix | | | | | | |

*FIG. 5*

FRIENDLY URLS

FIELD OF THE INVENTION

The present invention generally relates to accessing dynamically generated data with a static universal resource locator (URL), and more specifically, pertains to accessing data that are dynamically generated with one or more query parameters determined from elements of a static URL, instead of including the query parameters in a conventional URL.

BACKGROUND OF THE INVENTION

Searching for information is one of the most prevalent activities on the Internet. Individuals increasingly use search engines that show lists of web sites potentially related to topics of interest. However, finding relevant information is difficult, because it is difficult for individual users and conventional search engines to identify relevant content among the enormous volume of accessible data. Further, most substantive content is not readily accessible, because the content is stored in databases that are used to dynamically generate documents and other data instead of being stored as static files. To access database content, a query string is typically specified in a URL that also identifies a network address of the database, so that the specific database to be searched for the desired content is identified in the query. URLs with query strings frequently become very long and complex. As the complexity of database driven Web sites has increased, it has become highly unlikely that a typical user will correctly type a URL and a query string to access content of possible interest on even a known Web site.

Similarly, secondary users of the Internet, such as conventional search engines and dynamic web crawlers, are often set up to avoid links that include URLs with a query string. Consequently, a large amount of the most valuable and substantive information that is available is not reported. To counteract this problem, some Web sites have been designed specifically for Web crawlers and search engines instead of for individual users. To ensure that their content is indeed identified in search results, such Web sites may use "cloaked URLs" to present different Web pages to Web crawlers than they do to individuals using browser programs to explore the Web sites. These Web sites detect when a request is from a Web crawler and redirect the request to a Web page that is specifically designed to maximize a search ranking in the reported search results, rather than to provide the page that a user would view in a browser. However, many search engine operators disapprove of this practice of cloaking URLs. Search engine operators try to ensure that their search engines return lists of Web pages that would actually be seen by their customers, if the customers were browsing the Web sites represented in the lists. Search engines are thus frequently set up to consider cloaked URLs as a form of spam and to make special efforts to eliminate cloaked URLs from their search results.

Another approach used to identify and access information on database driven Web sites evaluates a user's keywords, and attempts to match those keywords to a relevant search engine that is closely tied to one or a few database driven Web sites. This approach is sometimes discussed in terms of mining the "deep Web" or the "invisible Web." Based on the keywords, a query string is created, which is syntactically valid for a selected search engine that is closely tied to one or more relevant databases. This preprocessing approach of selecting relevant Web sites and creating custom queries for their corresponding database(s) provides an alternative to using a conventional, "all-purpose" search engine, such as GOOGLE™, ALTAVISTA™, etc. However, it would be preferable to utilize these conventional, all-purpose search engines to find the desired content in databases on the Web, because the conventional search engines are so widely used. Thus, it is preferable to provide a way for Web site operators to make their database content accessible and searchable using conventional search engines and Web crawlers. It is further desirable to enable users to search database content directly from a browser when the user already knows one or more database driven Web sites that likely contain relevant information.

SUMMARY OF THE INVENTION

The present invention provides a method and system for enabling a Web crawler, search engine, browser or other client application to access data by using "friendly" URLs that do not require conventional query parameters or other non-intuitive coding, and which are dynamically obtained and/or created. Such URLs are friendly because they are easy to read and understand by humans and are in a form that is readily searchable by conventional search engines, Web crawlers, browsers, and other client applications. A friendly URL comprises a static URL that appears to identify a location and name of a static resource such as a conventional hypertext markup language (HTML) document. A friendly URL does not include query strings, and preferably does not directly refer to any active server page (ASP) script, common gateway interface (CGI) script, or other executable module. The present invention enables a friendly URL to be mapped to a data source, such as a database driven Web site, and causes the data source to dynamically access or generate data associated with an easily understood data key provided in the friendly URL. The data key can refer to specific information known to be available from the data source, and/or indicate a keyword that can be used to search the data source for related information of possible interest.

A friendly URL can be incorporated into a link in a source document that is accessible to a conventional search engine, Web crawler, browser, or other client application. Alternatively, a friendly URL can be entered by a user into an address data field of a browser or other communication application. The friendly URL is communicated to a server or other communication module that incorporates the present invention and that is in communication with a desired data source. The communication module receives the friendly URL just as it would any other static URL, but does not immediately attempt to access the static resource indicated in the friendly URL. Instead, the friendly URL is parsed to determine whether the friendly URL includes a data type and a data key at predefined locations within the URL string. The data type preferably refers to a text data source, an image data source, a media data source, or other data source that is dynamically accessible. The data key can comprise a specific data identifier or a search term. If a recognized data type is found in the received friendly URL, a query URL is constructed with a data source identifier that is mapped to the data type. The data source identifier preferably refers to a script or other function that can dynamically access data from the data source. This internal mapping of friendly URLs to data sources enables data providers to change the mappings whenever internal data locations change and does not require updating links to the data on existing Web pages. The internal mapping also provides a layer of security by not directly disclosing the location, data access function, and other details to the client application and/or user, as occurs when using a real URL. The data key is also incorporated into the query URL as a query parameter with any other code characters needed by the data source to dynamically access and/or generate data associated with the data key. The query URL can be communicated directly to the data source or internally redirected to the data source. In any case, the resulting dynamically accessed data are then communicated back to the requesting client application, but are identified only by reference to the original friendly URL.

Another aspect of the present invention is directed to a memory medium that stores machine instructions for carrying out the steps described above and as discussed in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 5 illustrates Table 1, which shows a mapping between data types of a friendly URL and data sources used to dynamically access the data.

DESCRIPTION OF THE PREFERRED EMBODIMENT

Exemplary System for Implementing Present Invention

Figure 1:
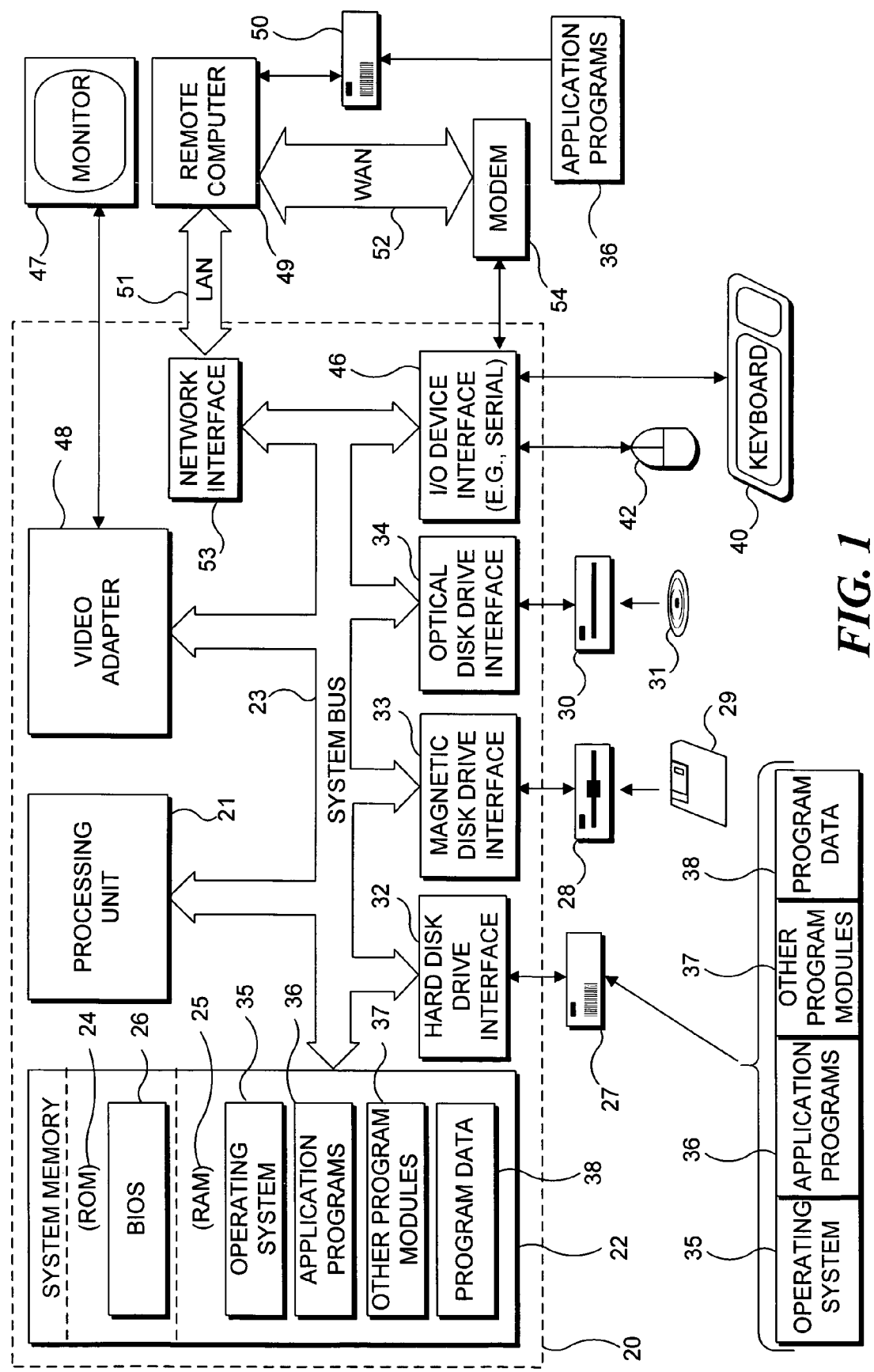
FIG. 1 is a functional block diagram of a generally conventional computing device, such as a personal computer (PC) or server, suitable for connecting to and communicating over the Internet.

FIG. 1 illustrates an exemplary system suitable for implementing various portions of the present invention, including executing server software or executing a Web browser such as Microsoft Corporation's INTERNET EXPLORER™ for accessing Web pages over the Internet. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a compact disc-read only memory (CD-ROM) or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disc 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disc 31, ROM 24, or RAM 25, including an operating system 35, one or more application programs 36, other program modules 37, and program data 38. A user may enter commands and information in to PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface—not shown), and printers.

The present invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 often will typically include a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to system bus 23 or coupled to the bus via I/O device interface 46, i.e., through a serial port. PC 20 may also communicate over a WAN through comparable network interfaces that are provided on the LAN to which the PC is coupled. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Request Specific Dynamic Data with Friendly URL

Figure 2A:
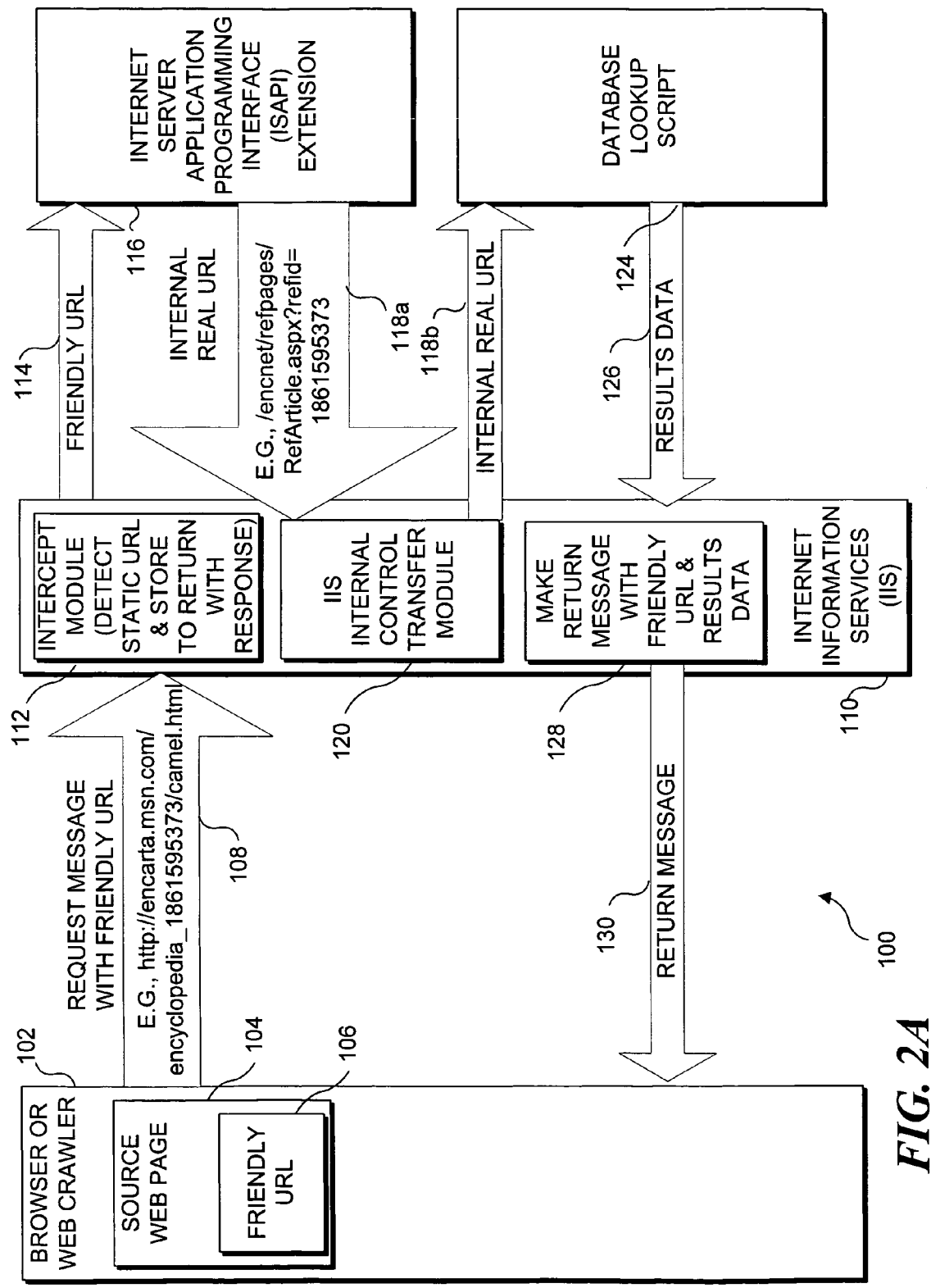
FIG. 2A is a block diagram showing software modules that process a friendly URL in a request message from a web crawler or browser that operates on a hyperlink in a source web page.

FIG. 2A comprises a block diagram 100 of software modules that illustrate, in an exemplary manner, the processes involved in handling a request for a specific dynamically generated document using a friendly URL. Block diagram 100 shows a browser or Web crawler 102 accessing a source Web page 104 that includes a hyperlink specifying a friendly URL 106. URL 106 is considered friendly because the URL does not include cryptic query parameters and/or query delimiters. Instead, friendly URL 106 is easily human readable because it clearly specifies a static hypertext markup language (HTML) document from a recognizable data source, such as an online encyclopedia. If a user selects the hyperlink specifying friendly URL 106 that is displayed in the browser program, or if a Web crawler accesses the hyperlink, friendly URL 106 is incorporated into a request message 108 that is sent to a computing platform executing server communication software 110. An example of such software is Microsoft Corporation's Internet Information Services (IIS) module.

As in the example of FIG. 2A, request message 108 preferably comprises a hypertext transfer protocol message to a known domain name and known directory such as the root directory of Microsoft Corporation's "encarta.msn-.com/" domain. Friendly URL 106 further indicates a data type, such as "encyclopedia," and a data key, such as "1861595373." The data type and data key are separated by a non-query separator such as an underscore character ("_"). The data type preferably refers to the form of the requested information—in this case, an encyclopedia article. Those of ordinary skill in the art will recognize that the data type could be a picture file, a video file, an audio file, or almost any kind of electronically transmittable file. The data key preferably refers to a specific document or other item of information that is to be dynamically generated from the storage being accessed. The document name "camel.html" indicates the topic of the dynamically generated data, but is expressed in static form with the ".html" extension.

An intercept module 112 of server communication software 110 recognizes the ".html" extension and stores the friendly URL. Intercept module 112 passes received friendly URL 114 to an application extension 116, such as an Internet Server Application Programming Interface (ISAPI) Extension. The application extension evaluates the friendly URL and generates an internal real URL 118*a*. Internal real URL 118*a* specifies the query parameters and/or other coding needed to dynamically access or generate the desired encyclopedia article or other information. In general, the internal real URL is in a form that contains a source identifier, a data key, and a query indicator. In the example of FIG. 2A, "/encnet/refpages/RefArticle.aspx" of internal real URL 118*a* comprises a source identifier that specifies a source of the desired dynamically generated information. In this case, the source identifier refers to an internal directory location and name of a script that will construct the encyclopedia article as a web page. This source identifier is mapped from the data type "encyclopedia" received in the friendly URL. Because the internal directory location and script name are not included in the original friendly URL, there is an added level of security introduced by using a friendly URL. The data key "1861595373" is also incorporated into the internal real URL for use by the script. As a conventional query string, the internal real URL includes any necessary query indicators, such as a question mark "?."

Application extension 116 communicates internal real URL 118*a* to an internal control transfer module 120, which communicates a redirected internal real URL 118*b* to a database lookup script 124. The database lookup script retrieves data associated with the data key and/or dynamically generates a Web page, and passes results data 126 to a return module 128 controlled by the IIS server software. Return module 128 creates a return message 130 comprising the dynamically generated Web page (or other data) and friendly URL 106 that was previously stored and then communicates return message 130 to the requesting browser or Web crawler.

Requesting a Search with the Friendly URL

Figure 2B:
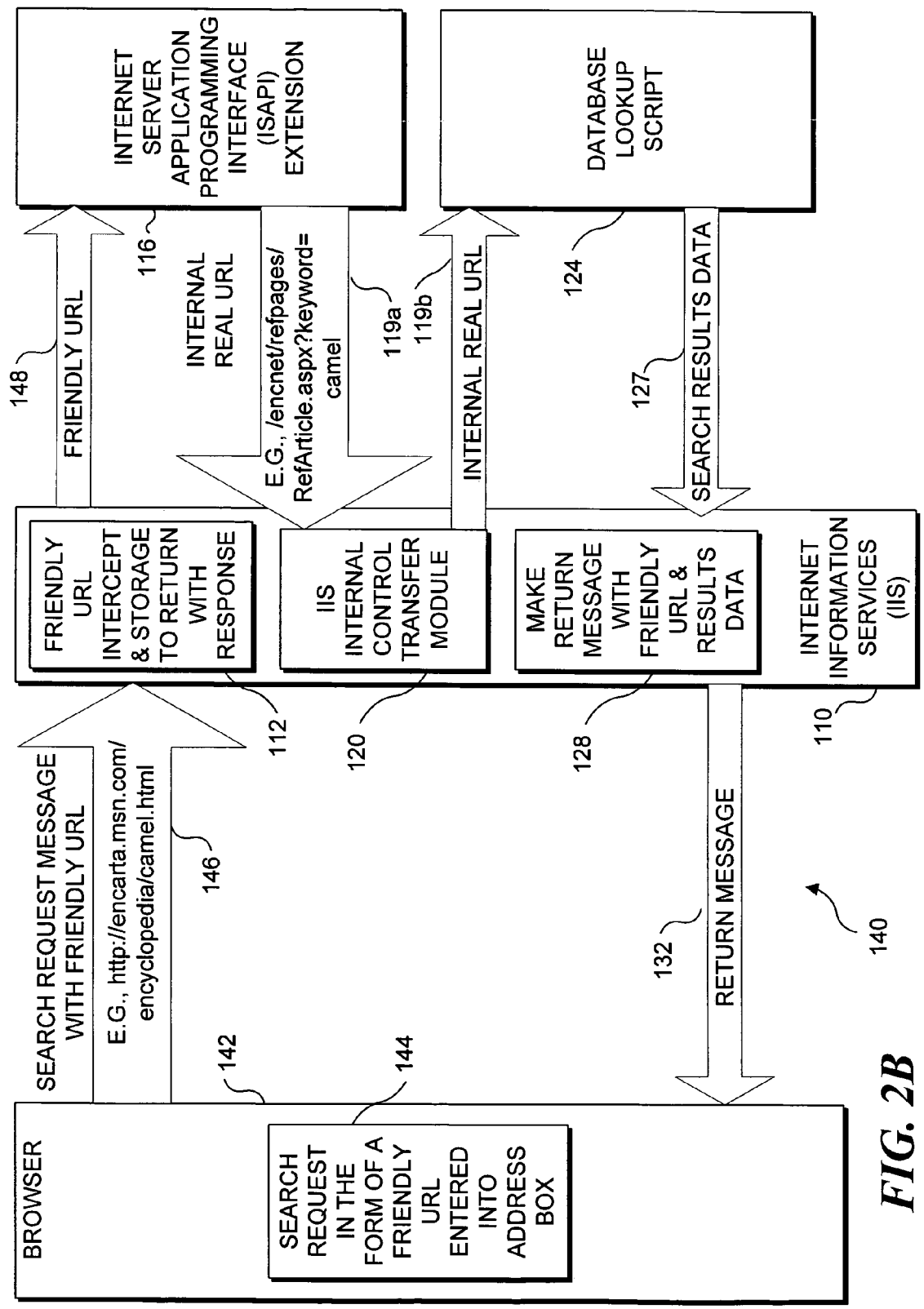
FIG. 2B is a block diagram showing software modules that process a friendly URL typed into an address box of a browser program and sent in a search request message.

FIG. 2B is a block diagram 140 of software modules and illustrates, in an exemplary manner, the processes involved in handling a search request made with a friendly URL. Through the address bar of a browser program 142, a user can enter a search request in the form of a friendly URL 144. The friendly URL is incorporated into a search request message 146 that the browser program sends to server communication software 110, which is executed by a server computing platform. As in the hyperlink example of FIG. 2A, the friendly URL in search request message 146 of FIG. 2B includes a data type, a separator, and a data key. However, in this search example, the data key specifies a search term rather than referring to a particular dynamically generated Web page or other particular dynamic data.

Also, similar to the hyperlink example, search request message 146 conforms to the hypertext transfer protocol and specifies a known domain name and known directory (e.g., "encarta.msn.com/"). Search request message 146 also includes the data type "encyclopedia" and a separator "/" (i.e., a forward slash). Again, the data type preferably refers to the form of the requested information, such as an encyclopedia article. The server software uses the separator to distinguish between the data type and data key and can comprise any predefined character other than a query character. The data key in this search example is the name of a static HTML file "camel" that can be easily specified by a user, rather than a reference number that is predefined in a hyperlink. The ".html" extension again indicates a simple static document, but the server software is designed to use the data type and data key of the static friendly URL to access and/or generate the dynamic data.

The remaining processing is very similar to the hyperlink example; however, a keyword search is performed rather than a direct dynamic access based on a predefined reference identifier. More than one search result may also be returned. In further detail, intercept module 112 of server communication software 110 recognizes the ".html" extension and stores the friendly URL. Intercept module 112 passes a received friendly URL 148 to application extension 116, which evaluates the received friendly URL and generates an internal real URL 119a. Internal real URL 119a specifies the query parameters and/or other coding needed to perform the keyword search. In general, the internal real URL is still in a form that contains a source identifier, a data key, and a query indicator. In particular, "/encnet/refpages/RefArticle.aspx" of internal real URL 119a still comprises the source identifier that specifies the source to be searched. In this case, the source identifier refers to an internal directory location and name of a script that will construct a search for one or more encyclopedia articles that will be generated based on the data key received. The data key "camel" is incorporated into the internal real URL for use by the script.

Application extension 116 communicates internal real URL 119a to internal control transfer module 120, which communicates a redirected internal real URL 119b to database lookup script 124. The database lookup script performs a search based on the data key and generates a search results page, encyclopedia article, or other appropriate search results. The database lookup script then passes search results data 127 to return module 128, which is controlled by the IIS server software. Return module 128 creates a return message 132 comprising the dynamically generated search results and friendly URL 144 that was previously stored. Return module 128 then communicates return message 132 to the requesting browser.

Providing Dynamically Accessed Data in Response to a Request

Figure 3:
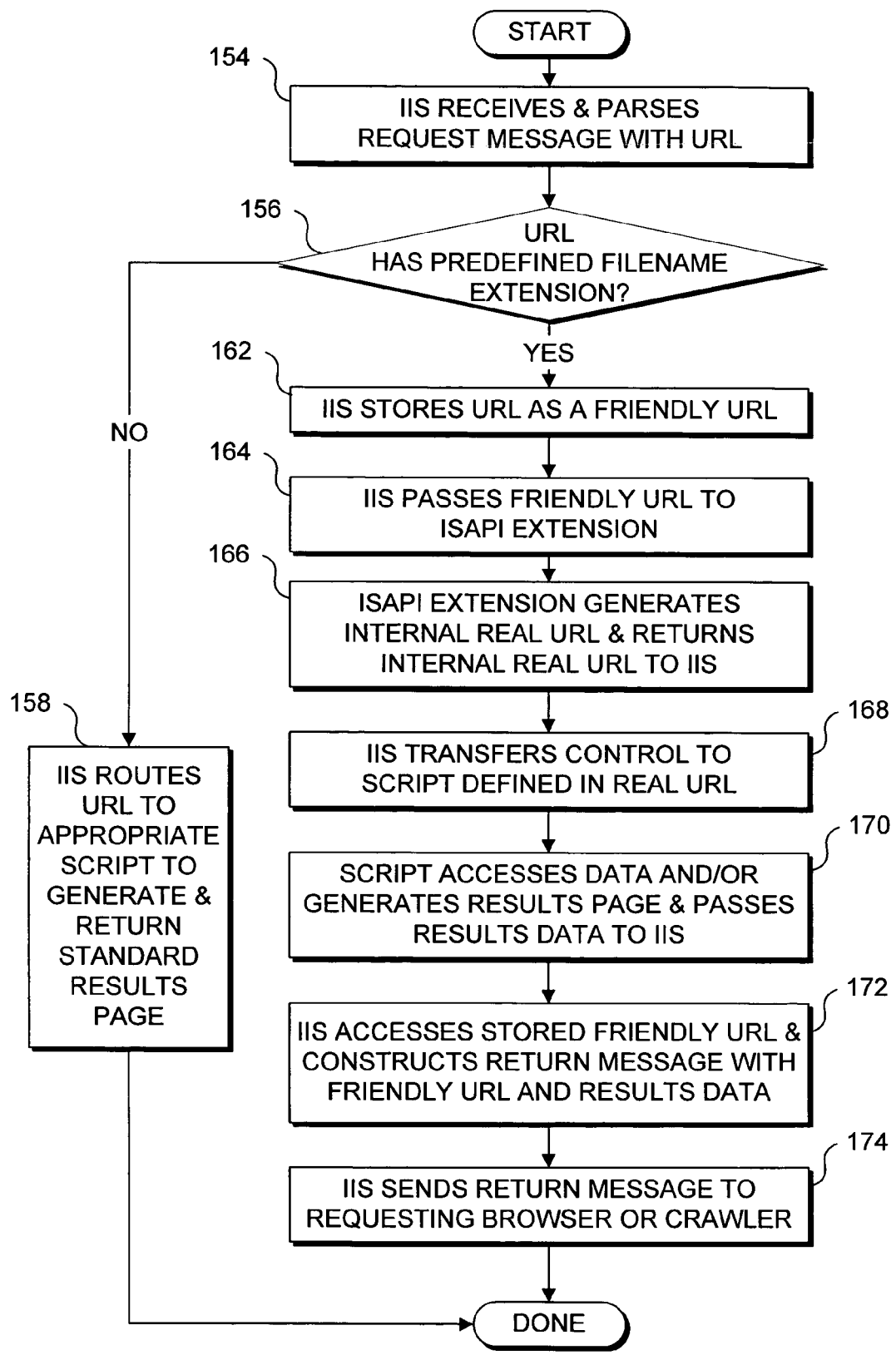
FIG. 3 is a flow diagram illustrating the logic for the process of providing dynamically accessed data to a requester that is only aware that a friendly URL is being used to access the data.

FIG. 3 is a flow diagram illustrating the process of providing dynamically accessed data to a browser program or Web crawler, based on a friendly URL. As discussed above, the intercept module of the IIS receives and parses the URL of a request message at a step 154. In a decision step 156, the IIS determines whether the URL includes a predefined filename extension, such as .html. If the URL does not include the predefined filename extension, the URL is not a friendly URL. Accordingly, the IIS routes the URL to an appropriate script at a step 158, which generates and returns a standard results page. However, if the URL does include a predefined filename extension, such as ".html", then the URL is a friendly URL. In that case, the IIS stores the URL, at a step 162, for later use with a return message. The IIS then passes the URL to the ISAPI Extension and also transfers control to the ISAPI extension, at a step 164.

In a step 166, the ISAPI extension generates the internal real URL and returns the internal real URL to the control transfer module of the IIS. As discussed in further detail below with regard to FIG. 4, the ISAPI extension uses the data type and data key of the friendly URL to construct an internal URL that contains a location, a script name, and query parameters. In a step 168, the control transfer module of the IIS redirects the internal real URL to the script defined in the internal real URL. This internal redirection process can be implemented with a child request of the original request. For instance, the ISAPI extension can call an HSE_REQ_EXEC_URL function of IIS version 6.0 to rewrite the received URL request to the script mapped to the data type. In a step 170, the script accesses the desired data associated with the data key and/or generates a results page. As noted above, the desired data are typically stored in a database and are readily accessible when accessed using scripts that are controlled by the sever software. The script passes the results data to the return module of the IIS. In a step 172, the return module of the IIS accesses the friendly URL that was stored at step 162 when the request message was received by the intercept module of the IIS. The return module constructs a return message with the friendly URL as a header and incorporates the results data (e.g., dynamically generated Web page, search results, etc.) into the return message. In a step 174, the IIS sends the return message to the requesting browser program or Web crawler. Thus, the requesting entity receives the requested information using an easily readable URL that does not include any query parameters. Also, by using the friendly URL in the return message, details of the internal real URL are not discoverable by the requesting browser program or Web crawler.

Constructing a URL for Internal Processing

Figure 4:
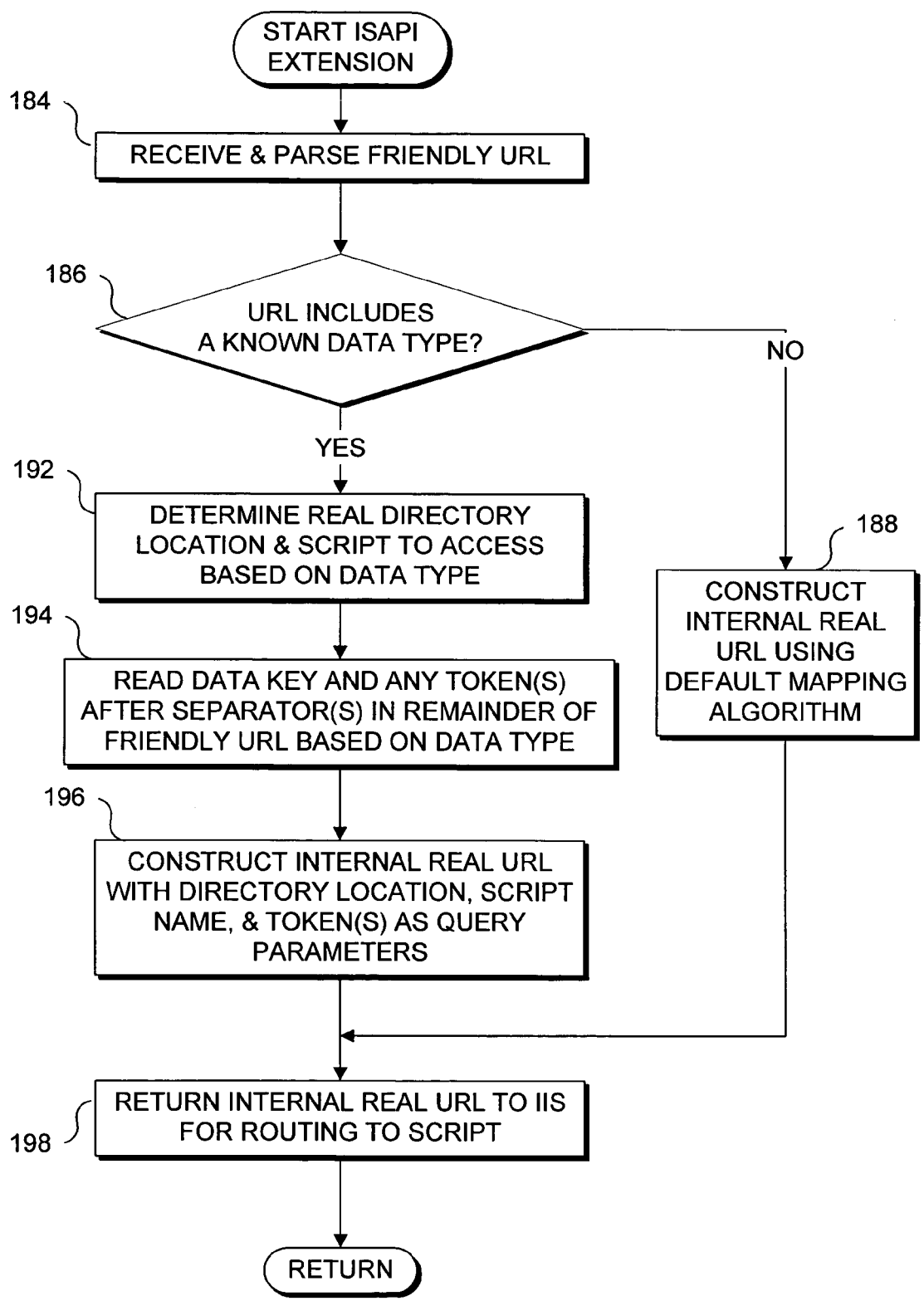
FIG. 4 is a flow diagram illustrating the detailed logic for the process of constructing a URL for internal processing by a server based on a friendly URL received in a message.

Further detail is now provided regarding steps employed for generating a real URL from a friendly URL as indicated in step 166 above. FIG. 4 is a flow diagram illustrating a method for constructing a corresponding internal URL for internal processing. At a step 184, the ISAPI extension receives the friendly URL from the IIS and parses it. In a decision step 186, the ISAPI extension examines the friendly URL to determine whether it includes a component followed by a predefined separator, such as an underscore or slash. If a separator component is present, the ISAPI extension determines whether the component matches a known data type. A known data type can include a text encyclopedia article, a dictionary entry, an image, a multimedia presentation, or other digital file. If a known data type is not found or an appropriate separator is not identified, the ISAPI extension uses a default mapping algorithm to construct the internal real URL at a step 188. The default mapping algorithm preferably processes conventional static URLs and/or other URLs that do not include a known data type.

However, if a known data type is found, the ISAPI extension uses the data type, at a step 192, to ascertain the directory location and the script required to dynamically access and/or generate the requested information. Table 1, which is shown in FIG. 5, illustrates some of the data types and corresponding paths to data source scripts used to dynamically access and/or generate data from an online encyclopedia Web site. After detecting a separator, the ISAPI extension further analyzes the friendly URL in a step 194, to identify a data key and any other parameters expected to be associated with the data type. These parameters are sometimes referred to as tokens. Those skilled in the art will recognize that different separator characters can also be used to help identify different data keys and/or associated parameters. The separator can also be used to help distinguish between a friendly URL that identifies a specific data item (e.g., a specific Web page) and a friendly URL that indicates a keyword search.

In a step 196, the ISAPI extension constructs an internal real URL by replacing the data type of the friendly URL with the directory location and script name of the corresponding data source. The ISAPI extension also replaces the separator of the friendly URL with the appropriate query character(s) and places the data key and token(s) in the appropriate locations to complete a valid query string for use in the internal real URL. In a step 198, the ISAPI extension returns the internal real URL to the IIS software for internally redirecting to the data source script.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A method for providing dynamically accessed data stored in a database to a requester that is aware of only a specified uniform resource locator (URL), comprising the steps of:
   (a) receiving at least a path portion of a specified URL that originated at a requester, the specified URL having been entered by a user into an address data field of an application, the path portion lacking any database query indicators for querying areas of subject matter in one or more databases accessible to the user;
   (b) parsing pre-defined locations within the path portion of the received URL to detect:
      (i) a data type that indicates a source of the dynamically accessed data from among a plurality of sources of data stored in the database, and format information for the dynamically accessed data indicating a format type for one or more portions of dynamically accessed data; and
      (ii) a data key for the dynamically accessed data indicating an area of subject matter to be searched and accessed from among the information associated with the indicated data type in the database, the subject matter corresponding to the data key portion of the specified URL entered by the user;
   (c) using the data type to search a plurality of query indicators corresponding to the data type of the dynamically accessed data, the query indicator having one or more database query strings;
   (d) using the data key to identify an appropriate area of subject matter to be searched using an appropriate query indicator identified from among the plurality of query indicators; and
   (e) returning the identified query indicator, the query indicator being mergeable into a query URL for submission to the database, such that the query URL can be used to access the dynamically accessed data for return to the requester, notwithstanding that the specified URL was entered by the user.

2. The method of claim 1, wherein both the specified URL and the query indicator are formatted according to a single designated protocol.

3. The method of claim 1, wherein the received URL is received from one of:
   (a) a program that operates on a link in a source document, the link including the received URL; and
   (b) a browser program that obtains the received URL as a network address entered into the browser program.

4. The method of claim 1, wherein the specified URL ends with a predefined file extension.

5. The method of claim 1, wherein the data type comprises at least one of a text document, an image, and a media file.

6. The method of claim 1, wherein the data key comprises at least one of:
   (a) a reference identifier to a specific data content; and
   (b) a keyword employed to search the source for content related to the keyword.

7. The method of claim 1, wherein the step of parsing comprises the steps of:
   (a) detecting a first separator after a root URL identifying a network address;
   (b) detecting the data type between the first separator and a second separator; and
   (c) detecting the data key after the second separator.

8. The method of claim 1, wherein the details of the query indicator are not discoverable by the requestor.

9. A system for providing dynamically accessed data stored in a database to a requester that is aware of only a specified uniform resource locator (URL), comprising:
   (a) a processor; and
   (b) a memory in communication with the processor, the memory storing machine instructions that cause the processor to carry out a plurality of functions, including:
      (i) receiving at least a path portion of a specified URL that originated at a requester, the specified URL having been entered by a user into an address data field of an application, the path portion lacking any database query indicators for querying areas of subject matter in one or more databases accessible to the user;
      (ii) parsing pre-defined locations within the path portion of the received URL for:
         (1) a data type that indicates a source of the dynamically accessed data from among a plurality of sources of data stored in the database, and format information for the dynamically accessed data indicating a format type for one or more portions of dynamically accessed data; and
         (2) a data key for the dynamically accessed data indicating an area of subject matter to be searched and accessed from among the information associated with the indicated data type in the database, the subject matter corresponding to the data key portion of the specified URL entered by the user;
      (iii) using the data type to search a plurality of query indicators corresponding to the data type of the dynamically accessed data, the query indicator having one or more database query strings;
      (iv) using the data key to identify an appropriate area of subject matter to be searched using an appropriate query indicator identified from among the plurality of query indicators; and
      (v) returning the identified query indicator, the query indicator capable of being merged into a query URL for submission to the database, such that the query URL can be used to access the dynamically accessed data for return to the requester notwithstanding that the specified URL was entered by the user.

10. The system of claim 9, wherein the received URL does not indicate an executable function, and does not include the query indicator.

11. The system of claim 9, wherein the received URL is received from one of:
   (a) a program that operates on a link in a source document, the link including the received URL; and
   (b) a browser program that obtains the received URL as a network address entered into the browser program.

12. The system of claim 9, wherein the machine instructions further cause the processor to carry out the function of determining that the received URL ends with a predefined file extension.

13. The system of claim 9, wherein the data type comprises at least one of a text document, an image, and a media file.

14. The system of claim 9, wherein the data key comprises at least one of:
   (a) a reference identifier to a specific data content; and
   (b) a keyword employed to search the source for content related to the keyword.

15. A method for receiving and sending communications used in accessing dynamic data from a database according to a specified URL, the method comprising:
   (a) receiving a specified URL from a requester, the specified URL including a data type and a data key, the specified URL having been entered by a user into an address data field of an application, the data type indicating a source of the dynamically accessed data from among a plurality of sources of data stored in the database and format information for the dynamically accessed data indicating a format type for one or more portions of dynamically accessed data, the data key indicating an area of subject matter to be searched and accessed from among the information associated with the indicated data type in the database, the subject matter corresponding to the data key portion of the specified URL entered by the user;
   (b) sending at least a path portion of the specified URL including the data type and data key to a server application for generation of a query indicator, the query indicator having one or more database query strings;
   (c) receiving a generated query indicator from the server application;
   (d) merging the query indicator with a database identifier identifying the name and location of the database into a query URL;
   (e) submitting the query URL to the identified database;
   (f) receiving the dynamically accessed data from the identified database in response to submission of the query URL; and
   (g) sending the dynamically accessed data to the requester.

16. The method of claim 15, wherein information in the database is periodically updated to include new information corresponding to one or more data types or data keys.

17. The method of claim 15, wherein the dynamically accessed data is sent to the requestor in hypertext markup language (HTML) form.

* * * * *